H. B. JORDAN.
PHOTOGRAHIC APPARATUS.
APPLICATION FILED JUNE 17, 1908.
936,323.
Patented Oct. 12, 1909.
4 SHEETS—SHEET 3.
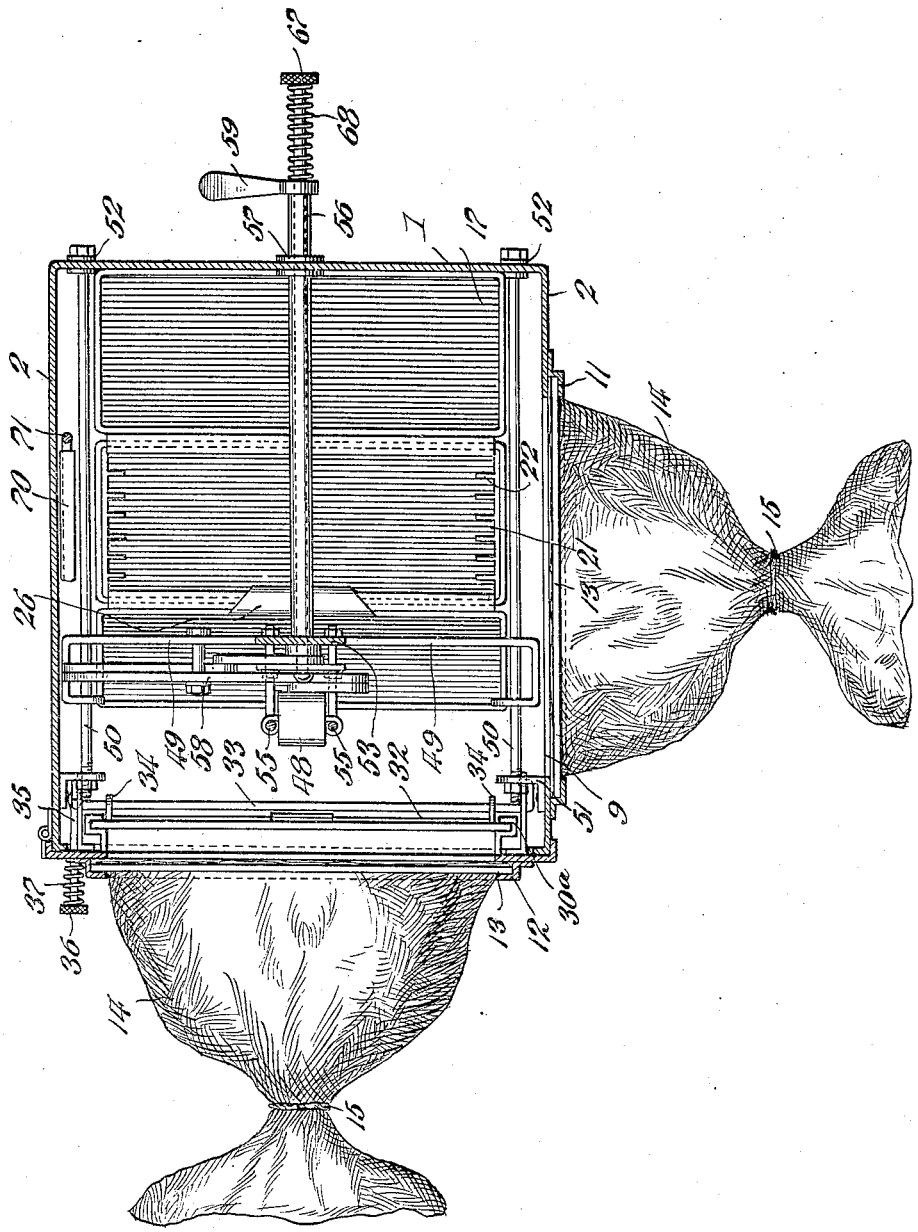
Witnesses
Frank B. Hoffman
John F. Byrne
Inventor
Henry B. Jordan
By Victor J. Evans
Attorney

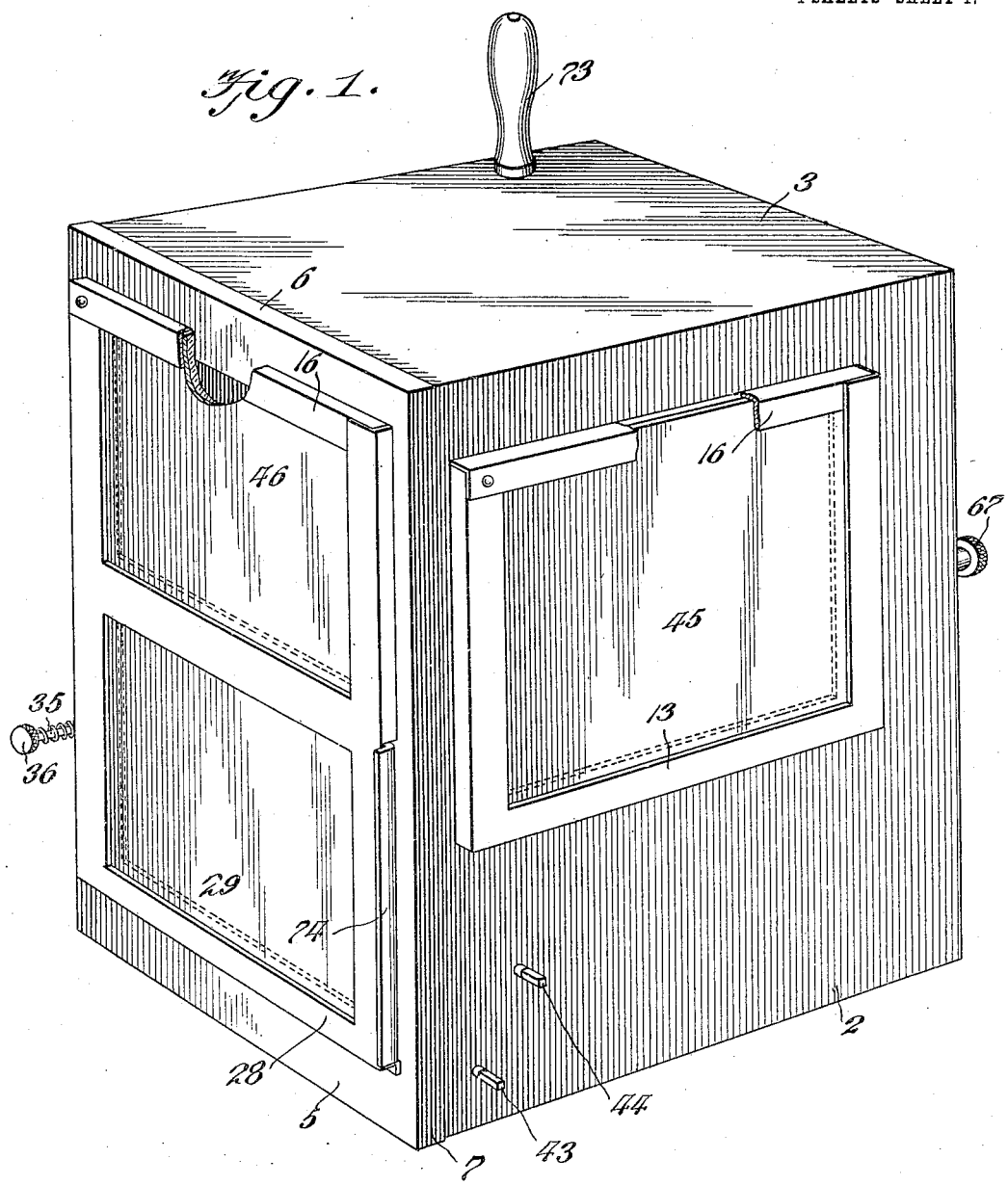

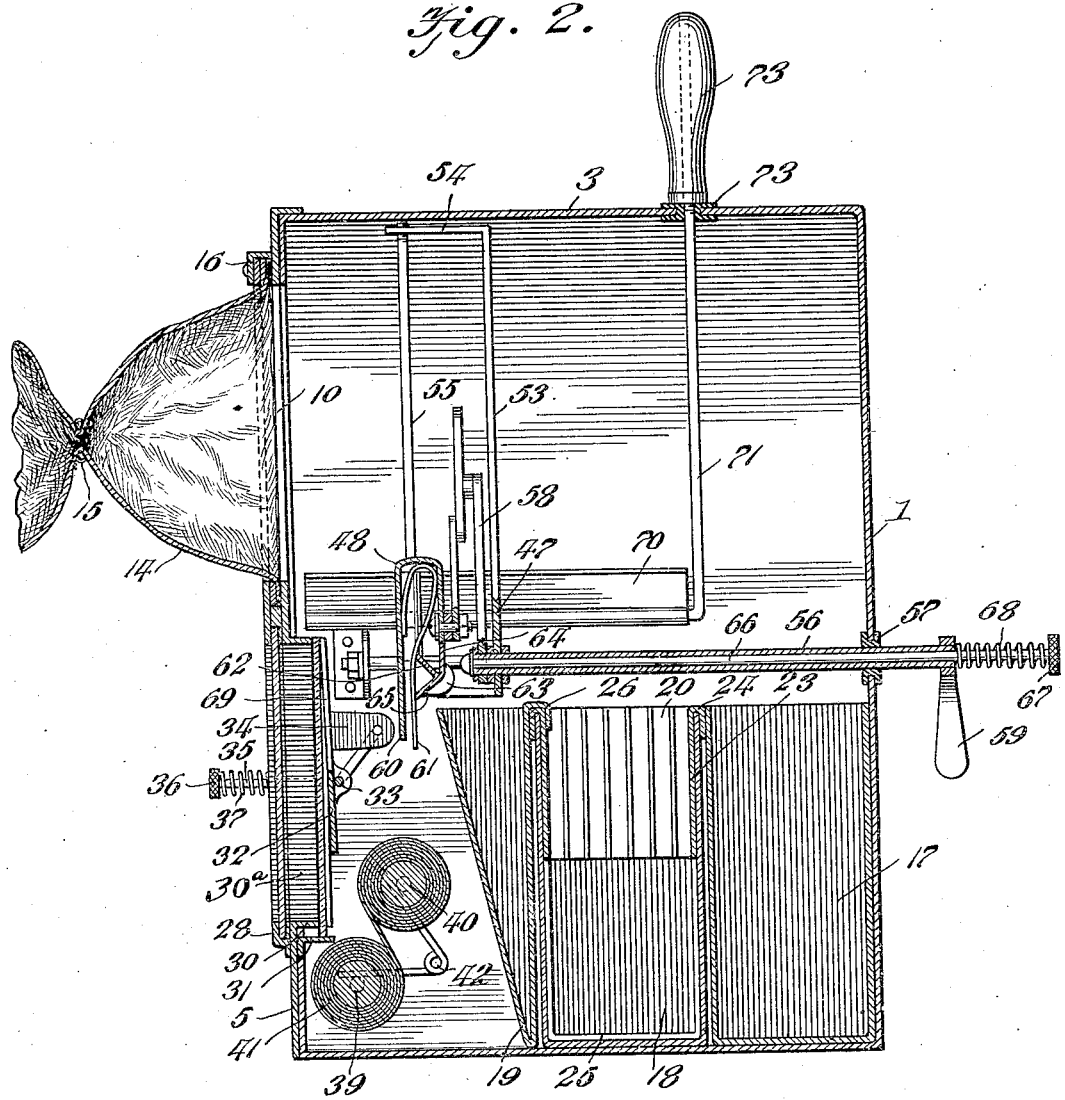

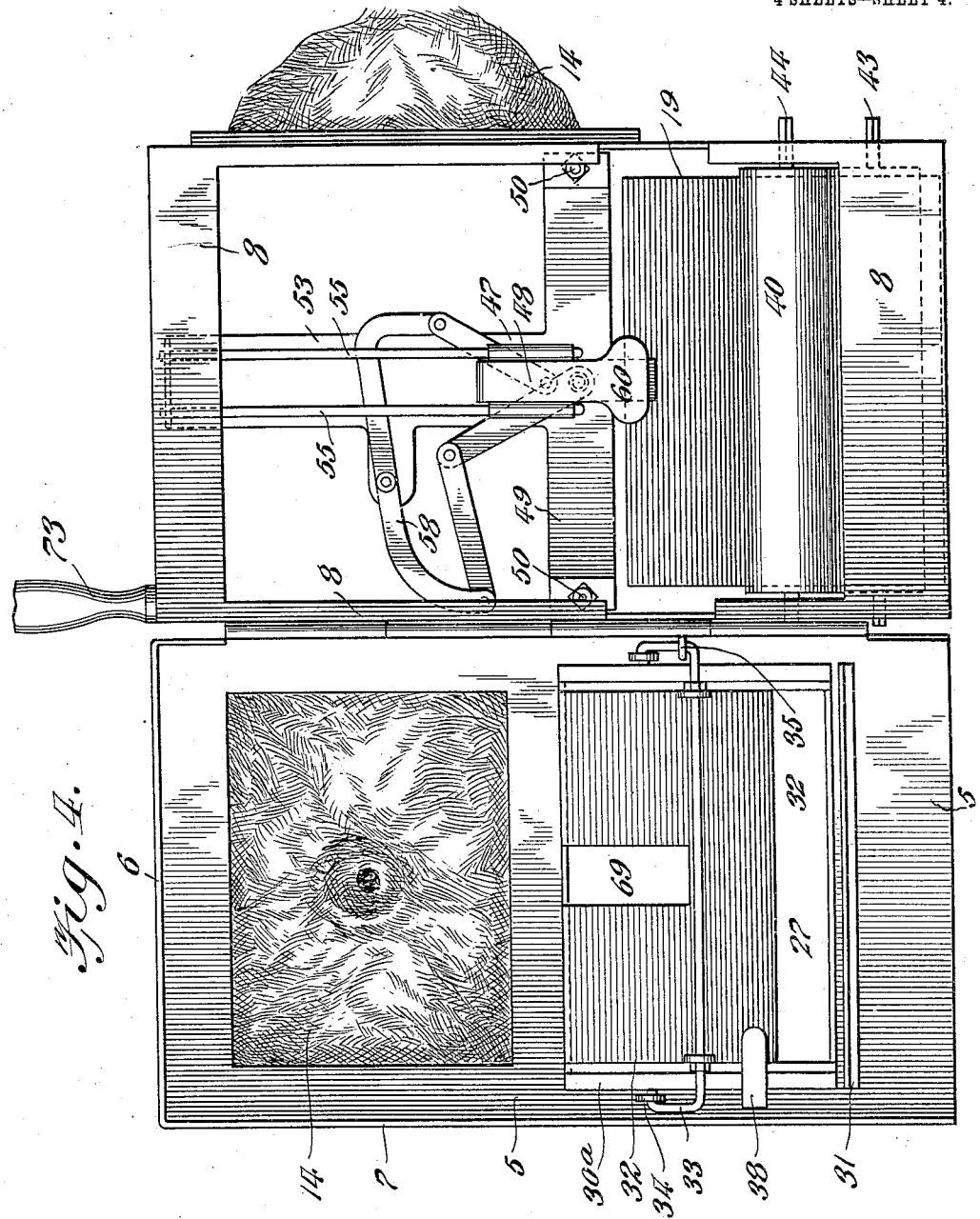

UNITED STATES PATENT OFFICE.

HENRY B. JORDAN, OF FORT LAWN, SOUTH CAROLINA.

PHOTOGRAPHIC APPARATUS.

936,323.   Specification of Letters Patent.   Patented Oct. 12, 1909.

Application filed June 17, 1908.   Serial No. 439,011.

*To all whom it may concern:*

Be it known that I, HENRY B. JORDAN, a citizen of the United States of America, residing at Fort Lawn, in the county of Chester and State of South Carolina, have invented new and useful Improvements in Photographic Apparatus, of which the following is a specification.

My invention relates to improvements in photographic apparatus, and its primary object is the provision of a device of this character in which a photographic negative can be developed, washed and fixed, and in which a photograph can be printed and the print developed, washed and fixed.

A further object of my invention is the provision of an apparatus of the above stated character which is simple, durable and efficient, and which may be manufactured and sold at a comparatively low cost.

With the above and other objects in view, the invention consists in the construction, combination and arrangement of parts hereinafter fully described, claimed and illustrated in the accompanying drawings, wherein:

Figure 1 is a perspective view of a photographic apparatus constructed in accordance with my invention. Fig. 2 is a sectional view taken on a plane extending centrally and vertically through the apparatus. Fig. 3 is a sectional view taken on a plane extending centrally and horizontally through the apparatus, and Fig. 4 is a view in front elevation of the apparatus, the door thereof being shown in opened position.

Referring to the drawings by reference numerals, 1 designates the rear, 2 the side, 3 the top and 4 the bottom walls of the casing of my improved photographic apparatus. The front side of the casing is fully open and is adapted to be closed by means of a hingedly mounted door 5. The top and free side edges of the door are provided with inwardly directed flanges 6 and 7, respectively, these flanges being adapted to embrace the top and one side of the casing. The frictional contact between the flanges 6 and 7 and the top and side of the casing is such as to hold the door in closed position against accidental opening. The front edges of the top, bottom and side of the casing are provided with inwardly directed flanges 8. One of the sides 2 of the casing of the apparatus is provided with an opening 9 and the door 5 is provided with an opening 10. Flanges 11 are secured to the side 2 and flanges 12 are secured to the door 5 about the openings therein, said flanges providing ways for the reception of frames 13 of sleeves 14. The outer ends of the sleeves 14 are closed to prevent light entering the casing through the sleeves by means of elastic members 15, which are secured to the sleeves at points adjacent their outer ends. The frames 13 are adapted to be held in applied position against accidental displacement by means of bars 16.

Tanks or trays 17, 18 and 19 are arranged within the casing of the apparatus, and when it is desired to develop one plate the developing solution is placed in the tank or tray 19, the fixing solution in the tank or tray 18 and the washing solution in the tank or tray 17. When it is desired to develop several plates at one time, the developing solution is placed in the tank or tray 18 and the fixing solution in the tank or tray 17, and a plate rack 20 is mounted in the tank or tray 18, the tank or tray 19 not being used. The plate rack 20 consists of ends 21 which are provided with a plurality of relatively spaced fingers 22 to provide intervening spaces for the reception of the plates. The ends 21 of the plate rack are connected by sides 23 which are provided with downturned flanges 24 adapted to engage over the upper side edges of the tank or tray 18. Bars 25 are secured to the sides 23 of the plate rack and are designed to support the plates.

The tanks or trays 17 and 18 are preferably rectangular in cross-section, while the tank or tray 19 is preferably substantially V-shaped in cross-section, the peculiar cross-sectional formation of the tank or tray 19 admirably adapting it for the use in developing one plate. The tank or tray 19 is provided with a hook 26 by means of which it is secured to the tank or tray 18, whereby it is held in applied position within the casing of the apparatus.

When it is desired to develop a plurality of plates, a sufficient quantity of developing solution is poured into the tank or tray 18 and a sufficient quantity of fixing solution is poured into the tank or tray 17 and the plate holder or holders are inserted into the casing of the apparatus through the doorway thereof. After the plate holder or holders are inserted in the casing, the door is closed and the operator inserts his hands into the casing through the sleeves 14, the members 15 tightly engaging the wrists of the operator so as to exclude all light from the interior of the casing. The operator then removes the plates from the holder or holders and places them in the rack 20. After the plates have been placed in the rack 20, the operator withdraws his hands from the casing. When the plates have been fully developed, the operator again inserts his hands into the casing through the sleeves 14 and withdraws the plate rack from the tank or tray 18 and inserts it into the tank or tray 17, which contains the fixing solution. If it is desired to develop only one plate the plate rack 20 is not used, and the developing solution is poured into the tank or tray 19, the fixing solution into tank or tray 18 and the washing solution into the tank or tray 17. The tanks or trays are adapted to be freely removed from and placed within the casing, whereby to permit the solution to be placed therein and removed therefrom.

To permit pictures to be printed in the machine, I provide the door 5 with an opening 27. The door is provided with flanges 28 which provide ways for the reception of the edges of a glass panel 27. The door 5 is provided with a flange 30 surrounding the opening 9 and formed to provide a pair of vertical guides 30ª adapted to receive a negative, the negative being supported by means of a bracket 31 secured to the inner surface of the door below the opening. The printing paper is adapted to be held in contact with the negative by means of a plate 32 which is pivotally mounted upon a crank shaft 33 journaled at its ends in brackets 34 secured to the inner surface of the door 5. The manner of mounting the shaft 33 is such that when the same is moved in one direction the plate 32 is moved away from the negative, and when the shaft is moved in the opposite direction, the plate is moved into contact with the negative. The shaft 33 is adapted to be operated to move the plate 32 away from the negative through the medium of a push rod 35 which is slidably mounted on the door 5 and which is secured at one end to the shaft 33, the outer end of the push rod being provided with a milled operating head 36. The shaft is adapted to be operated to move and hold the plate 33 in contact with the negative through the medium of a coiled expansible spring 37 which is mounted upon the push rod 35 between its operating head 36 and the door 5. The movement of the shaft in one direction, that is to say, in the direction to withdraw the plate 32 from the negative, is limited by means of an arm 38 which is secured to the door 5 and which is disposed for engagement by the plate 32. Rollers 39 and 40 are journaled in the side walls 2 of the casing of the apparatus. The rollers are arranged in parallel relation and are located at points adjacent the lower front end of the casing. The upper roller 40 is arranged a little in rear of the lower roller 39, and an apron 41 of black material is mounted on one roller to be spooled therefrom onto the other. A spring member 42 is secured to one side wall 2 of the casing and has its ends disposed for engagement with the rollers 39 and 40, said member being adapted to hold the rollers against accidental movement. The rollers are respectively provided with angular extensions 43 and 44, said extensions being adapted to be received by the rectangular socket of a winding key.

When it is desired to print pictures the sleeve 14 carried by the side 2 of the casing is removed and a colored glass 45 is substituted therefor, and the glass is held in position against accidental displacement by the bar 16. The packet of papers is inserted in the casing through the door opening and the door is closed, after which the operator inserts his hand into the casing through the sleeve 14 carried by the door. The operator then removes the papers from the packet and turns the roller 39 to wind the apron 41 thereon. During the winding of the apron on the roller 39, the pieces of printing paper are consecutively placed upon the apron so as to be wound upon the rollers between the folds of the apron. After the printing paper has been thus wound upon the roller 39, the sleeve 14 is removed from the door 5 and a colored glass 45 substituted therefor, said glass being secured in applied position against accidental displacement by means of the bar 16. After the negative has been inserted in the guides 30ª the plate 32 is moved away from the negative, the lower end of the plate resting in contact with that portion of the apron carried by the roller 40. With the plate 32 in this position, the roller 40 is turned. The turning of the roller 40 unwinds the apron from the roller 39, thereby consecutively presenting the pieces of paper. After the piece of printing paper is presented, it is guided by the plate 32 between itself and the negative. After the paper has been fully discharged from between the folds of the apron 41, the plate 32 is released to carry the printing paper in contact with the negative. When in the printing frame, the printing paper rests upon the bracket 31. After the paper has been exposed for a proper length of time, it is removed from the printing frame and placed in the tank or tray 17 containing the washing solution, then in the tank or tray 19 containing the developing solution, then again in the tank or tray 17 and then in the tank or tray 18 containing the fixing solution.

The means for removing the print from the frame and placing it in the solutions comprises a slidably mounted carriage 47 and a clamp 48 which is carried by the carriage. The carriage 47 is provided with arms 49 which are slidably mounted upon bars 50 arranged within the casing above the tanks or trays. One end of each bar 50 is supported by the rear wall 1 of the casing and the other ends thereof are supported in brackets 51 secured to the inner surface of the side walls 2 of the casing. Those ends of the bars 50 which are carried by the rear wall 1 of the casing pass through gaskets 52 which are designed to prevent any light entering the casing between the bars and the walls of the openings through which they pass. The carriage 47 is provided with a vertically rising standard 53 provided at its upper end with a supporting arm 54. Guide rods 55 are carried by the arm 54 and their lower ends are bent and secured to the carriage 47. The clamp 48 is slidably mounted upon the guide rods 55. The carriage 47 is adapted to be adjusted to place the clamp 48 in position for engagement with the print, and the clamp is adapted to be adjusted to withdraw the print from the printing frame or to place it in the developing or washing baths through the medium of a tubular rod 56. The rod 56 is revolubly secured at one end to the carriage 47 and slidably passes through a gasket 57 secured in an opening in the rear wall of the casing. A plurality of levers 58 are connected together and to the clamp 48 and the rod 56 in such manner that the rocking of the rod 56 will elevate and lower the clamp 48. The rod 56 is adapted to be operated through the medium of a handle 59. The clamp 48 comprises a relatively stationary jaw 60 and a relatively movable spring jaw 61. The relatively movable spring jaw 61 is adapted to be moved into and held in clamping position by means of a member 62, which is pivotally mounted between a pair of lugs 63 carried by the relatively stationary jaw 60. The jaw closing member 62 is provided with angular flanges 64 and 65 which are adapted to be respectively engaged by a push bar 66 to operate the jaw closing member 62. The push bar 66 is carried by the rod 56 and has its inner end disposed for engagement with either the flange 64 or 65 of the jaw closing member 62, whereby said jaw closing member may be operated to close the jaw or operate to permit the jaw to automatically move into its open position. The outer end of the push bar 66 is provided with an operating head 67, and a coiled expansible spring 68 is mounted thereon between the outer end of the rod 56 and said head, said spring being adapted to retain the inner end of the rod out of engagement with the inner end of the closing member 62.

After the photograph has been printed the rod 56 is operated to elevate the clamp 48 and the carriage 47 is moved in the direction of the printing frame through the medium of said rod and the slide 74 is inserted in rear of the panel 29. After the carriage has been properly positioned, the plate 32 is swung away from the negative and the clamp 48 is lowered so as to pass downwardly in a slot 69 formed in said plate. This downward movement of the clamp positions the print between the jaws thereof. The operation of the bar 66 will engage the wing 64 and move the member 62 to close the movable jaw 61 of the clamp 48, thus firmly securing the print in the clamp. The rod 56 is then operated to elevate the clamp 48, after which the rod is operated to move the carriage to a position where the print will be directly above the tank or tray 17 which contains the washing solution. As the print rests upon the bracket 31 when in the printing frame, the print will not fall when the plate 32 is swung away from the negative and before the clamp 48 engages the print. The print is lowered into the washing solution by the lowering of the clamp 48 through the medium of the rod 56. After the print has been lowered into the washing solution, the member 70 is swung to extend longitudinally of the tank, or tray 17. When in such position the member 70 overhangs the tank or tray 17. After the member 70 has been thus positioned, the clamp 48 is operated to withdraw the print from the washing solution, the withdrawal of the print causing it to be engaged and straightened by the member 70. After the print is once straightened, it will not curl, thereby enabling it to be repeatedly dipped in the developing solution and fixing solution. After the print has been treated in the developing solution, it is rinsed in the washing solution and then placed in the fixing solution. The print may be watched through the glasses 45 or 46.

From the foregoing description taken in connection with the accompanying drawings, the construction and mode of operation of the invention should be understood without a further extended description.

Changes in the form, proportions and minor details of construction may be made within the scope of the claims without departing from the spirit or sacrificing any of the advantages of the invention.

Having fully described and illustrated my invention, what I claim is:

1. A photographic apparatus comprising a casing, a printing frame carried thereby, a carriage movably mounted in the casing, a clamp movably mounted upon the carriage, and means by which the carriage and clamp may be operated to withdraw the print from the printing frame and place it in a bath.

2. A photographic apparatus comprising a casing, a printing frame carried thereby, means by which the print may be removed from the printing frame and placed in a bath, and means by which the print can be straightened in the bath.

3. A photographic apparatus comprising a casing, a negative holder, a plate adapted to hold a piece of printing paper in contact with the negative, and means by which a piece of printing paper may be placed between the plate and negative.

4. A photographic apparatus comprising a casing, a negative holder carried thereby, a pair of rollers, an apron wound about one of the rollers and adapted to be unwound therefrom about the other, said apron being adapted to have printing paper contained within the folds thereof, and a plate adapted upon the operation of one roller to guide the printing paper between itself and the negative, and means adapted to move the plate so as to clamp the printing paper on the negative.

5. A photographic apparatus comprising a casing, a printing frame carried thereby, a carriage slidably mounted in the casing, a bar, a clamp slidably mounted on the carriage, a connection between the clamp and bar, means adapted to move and secure the relatively movable jaw of the clamp in closed position, and means by which said jaw closing means can be operated.

6. A photographic apparatus comprising a casing, tanks or trays secured thereto, a printing frame carried thereby, means by which the printing paper can be placed in the frame, means by which the print may be removed from the frame and placed in a bath, and means by which the print may be straightened out in the bath.

7. A photographic apparatus comprising a casing, a tank within the casing, a printing frame carried by the casing, a clamp movably mounted in the casing, and means by which the clamp may be manipulated to remove the print from the frame and place it in the tank.

8. A photographic apparatus comprising a casing provided with a door, a tank within the casing, a printing frame carried by the door, and a manually operable means by which the print may be removed from the printing frame and placed in the tank.

9. A photographic apparatus including a casing, a printing frame carried by the casing, and means adapted to carry a plurality of sheets of printing paper, each operation of the means placing a sheet of printing paper in the printing frame.

10. A photographic apparatus comprising a casing, a tank within the casing, a printing frame carried by the casing, means adapted to carry a plurality of sheets of paper, each operation of the means placing a sheet of printing paper in the printing frame, and means by which the print may be removed from the printing frame and placed in the tank.

11. A photographic apparatus including a casing, a carriage movably mounted in the casing, a clamp movably mounted upon the carriage, means by which the carriage may be moved, and means by which the clamp may be moved on the carriage, said clamp being capable of being moved during the movement of or when the carriage is stationary.

In testimony whereof I affix my signature in presence of two witnesses.

HENRY B. JORDAN.

Witnesses:
OSWALD ALEXANDER,
J. J. JORDAN.